(12) United States Patent
Mitra et al.

(10) Patent No.: US 7,759,644 B2
(45) Date of Patent: Jul. 20, 2010

(54) SPECTRALLY TUNABLE INFRARED IMAGE SENSOR HAVING MULTI-BAND STACKED DETECTORS

(75) Inventors: Pradip Mitra, Colleyville, TX (US); James E Robinson, Dallas, TX (US); John M Dell, Crawley (AU); Charlie A Musca, Crawley (AU); Laurie Faraone, Crawley (AU)

(73) Assignee: DRS RSTA, Inc., Dallas, TX (US)

( * ) Notice: Subject to any disclaimer, the term of this patent is extended or adjusted under 35 U.S.C. 154(b) by 0 days.

(21) Appl. No.: 12/050,460

(22) Filed: Mar. 18, 2008

(65) Prior Publication Data
US 2009/0236525 A1  Sep. 24, 2009

(51) Int. Cl.
*G01J 5/20* (2006.01)
(52) U.S. Cl. .................................. 250/338.4
(58) Field of Classification Search .... 250/338.1–338.5
See application file for complete search history.

(56) References Cited

U.S. PATENT DOCUMENTS

| 5,589,689 | A | * | 12/1996 | Koskinen | 250/339.01 |
| 5,981,950 | A | * | 11/1999 | Wolny et al. | 250/338.4 |
| 6,301,042 | B1 | * | 10/2001 | Pelekhaty | 359/359 |
| 2007/0242358 | A1 | * | 10/2007 | Lin et al. | 359/578 |

OTHER PUBLICATIONS

Dell et al., "Tunable Infrared sensors-integration of MEMS with semiconductor detectors,", 2006, Optical MEMS and Their applications Conference, IEEE/LEOS international conference, pp. 5-6.*

Neumann et al., "Tunable infrared detector with integrated micromachined Fabry-Perot Filter,", 2007, Proc. of SPIE vol. 6466, pp. 646606-1-646606-12.*

Smith et al., "HgCdTe Focal Plane Arrays for Dual-Color Mid- and Long Wavelength Infrared detection,", 2004, Journal of Electronic materials, vol. 33, No. 6. pp. 509-516.*

(Continued)

*Primary Examiner*—David P Porta
*Assistant Examiner*—Kiho Kim
(74) *Attorney, Agent, or Firm*—Sonnenschein Nath & Rosenthal LLP (57) ABSTRACT

A tunable infrared detector is provided that includes a substrate, a bottom wavelength detector formed over the substrate, a top wavelength detector formed over the first wavelength detector layer, and an interferometer filter formed over the top wavelength detector layer and the bottom wavelength detector layer. The interferometer filter is operatively configured to pass a first wavelength associated with a first portion of a predetermined band and a second wavelength associated with a second portion of the predetermined band to the top wavelength detector. The top wavelength detector is operatively configured to detect each wavelength associated with the first portion of the predetermined band and to transmit each wavelength associated with the second portion of the predetermined band to the bottom wavelength detector. The bottom wavelength detector is operatively configured to detect each wavelength associated with the second portion of the predetermined band.

28 Claims, 4 Drawing Sheets

OTHER PUBLICATIONS

Rubio et al, "Optical simulation of a MOEMS based tunable Fabry-Perot interferometer,", 2004 IEEE, Proceedings of IEEE, Sensors, pp. 1324-1327.*

Faraone, "MEMS for tunable mutli-spectral infrared sensor arrays," 2005, Proceedings of SPIE, vol. 5957, pp. 59570F-1-59570F-12.*

Mitra et al., "SWIR hyperspectral detection with integrated HgCdTe detector and tunable MEMS filter," 2006, Proceedings of SPIE, vol. 6925, pp. 69250G-1-69250G-11.*

A. Rogalski, "HgCdTe infrared detector material: history, status and outlook," 2005, Institute of Physics Publishing, Reports on Progress in Physics, vol. 68, pp. 2267-2336.*

M.A. Kinch, JD, et al., HgCdTe Electron Avalanche Photodiodes, Journal Electronic Material, vol. 33, No. 6, pp. 630-639 (2004).

H. Huang, et al., "Evaluation of Elastic Modulus and Stress Gradient of PECVD Silicon Nitride Thin Films" International Conference on Surface Integrity and Fracture, Brisbane, Australia, pp. 149-154 (Sep. 2004).

J.F. Siliquini, et al., "Improved Device Technology for Epitaxial HgCdTe Infrared Photoconductor Arrays" Semicond. Sci. Technol. 9, pp. 1515-1522 (1994).

K. J. Winchester, et al., "Tunable Fabry-Perot Cavities Fabricated from PECVD Silicon Nitride Employing Zinc Sulphide as the Sacrifical Layer" J. Micromech. Microeng. 11, pp. 589-594 (2001).

A. E. Hill, et al., "Stress in Films of Silicon Monoxide" British Journal of Applied Physics, vol. 18, pp. 13-22 (1967).

J. Antoszewski, et al., "A Monolithically Integrated HgCdTe SWIR Photodetector and Micro-Electro-Mechanical Systems-Based Optical Filter" Journal of Electronic Materials, vol. 34, No. 6, 5783, 716-721 (2005).

M.A. Kinch, "HDVIP FPA Technology at DRS Infrared Technologies", SPIE Proceedings, vol. 4369, 566-578 (2001).

P.D. Dreiske, "Development of Two-Color Focal Plane Arrays Based on HDVIP" SPIE Proceedings, vol. 5783, 325-330 (2005).

P. Mitra, J.D., et al., "Monolithic Tunable Fabry Perot Filter Integrated with SWIR HgCdTe Detector for Hyperspectral Detection" Meeting of the Military Sensing Symposia Specialty Group on Detectors (2005).

C. A. Musca, et al., Monolithic Integration of an Infrared Photon Detector With a MEMS-Based Tunable Filter, 888-890, IEEE Electron Device Letters, vol. 26, No. 12 888-890 (Dec. 2005).

* cited by examiner

SPECTRALLY TUNABLE INFRARED IMAGE SENSOR HAVING MULTI-BAND STACKED DETECTORS

STATEMENT OF GOVERNMENT INTERESTS

"Technical data" that may be disclosed in this application is (at the date of filing of the application) authorized by the U.S. Government for export only to Australia for use by the University of Western Australia in accordance with Agreement No. TA 2039-03 IAW and 22 CFR 125.4(b)(2).

FIELD OF THE INVENTION

The present invention relates to image sensors, more particularly, to a spectrally tunable infrared image sensor having multi-band stacked detectors.

BACKGROUND OF THE INVENTION

The current generation of hyperspectral imaging (HSI) systems for use in the infrared wavelength bands employ a focal plane array (FPA) with a broad spectral response, integrated in a diffraction grating based on a Fourier transform spectrometer. An HSI system would be more widely deployable and available for applications if the system is miniaturized into a small package in an integrated microsystem without sacrificing the performance that existing systems provide. Recently, an approach for miniaturizing a hyperspectral imaging system on a chip has been demonstrated by integration of the broadband detection capability of a HgCdTe infrared detector with an electronically tunable filter, all on a single chip. Narrowband wavelength tunability is achieved by a Micro-Electro-Mechanical-System (MEMS) based tunable Fabry Perot (F-P) filter fabricated directly on a photodetector. A readout integrated circuit (ROIC) serves to both integrate the detected signal as well as electronically tune the filter across the wavelength band. The F-P filters use dielectric mirrors in the form of distributed Bragg reflectors, which are formed from alternating layers of high and low refractive index, low loss materials such as Ge and $SiO_x$.

A key shortcoming of this approach is that the spectral tuning range of a F-P filter is generally limited to one octave in bandwidth range. In practice, the range is often lower due to the limitations in spectral width of the reflectors used to form the F-P resonant cavity. It is therefore not possible to use a single F-P cavity filter to tune over the wavelength range of, for example, 1.0-2.5 μm or the shortwave infrared (SWIR) band, a spectral band of considerable practical interest.

Therefore, there is a need for a spectrally tunable infrared detector or sensor that overcomes the problems noted above and others previously experienced for detecting a wide range (e.g., more than one octave) of infrared wavelengths.

SUMMARY OF THE INVENTION

Systems and articles of manufacture consistent with the present invention provide a tunable infrared detector and an infrared imaging system employing one or more of the tunable infrared detectors. The tunable infrared detector comprises a substrate, a bottom wavelength detector formed over the substrate, a top wavelength detector formed over the first wavelength detector layer, and an interferometer filter formed over the top wavelength detector layer and the bottom wavelength detector layer. The interferometer filter is operatively configured to pass a first wavelength associated with a first portion of a predetermined band and a second wavelength associated with a second portion of the predetermined band to the top wavelength detector. The top wavelength detector is operatively configured to detect each wavelength associated with the first portion of the predetermined band and to transmit each wavelength associated with the second portion of the predetermined band to the bottom wavelength detector. The bottom wavelength detector is operatively configured to detect each wavelength associated with the second portion of the predetermined band.

In one implementation, the interferometer filter includes a first mirror having a first plurality of dielectric layers, a second mirror having a second plurality of dielectric layers, and a pair of flexible supports disposed between the first mirror and the second mirror such that the first mirror is substantially parallel with and disposed a first predetermined distance over the second mirror. Each of the flexible supports is operatively configured to receive an electrical or mechanical input and to move the first mirror from the first predetermined distance to a second predetermined distance over the second mirror in accordance with the electrical or mechanical input. In this implementation, the interferometer filter may be operatively configured to pass a third wavelength associated with the first portion of the predetermined band and a fourth wavelength associated with the second portion of the predetermined band to the top wavelength detector when the first mirror is disposed at the second predetermined distance over the second mirror.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Reference will now be made in detail to an implementation in accordance with methods, systems, and products consistent with the present invention as illustrated in the accompanying drawings.

Figure 1:
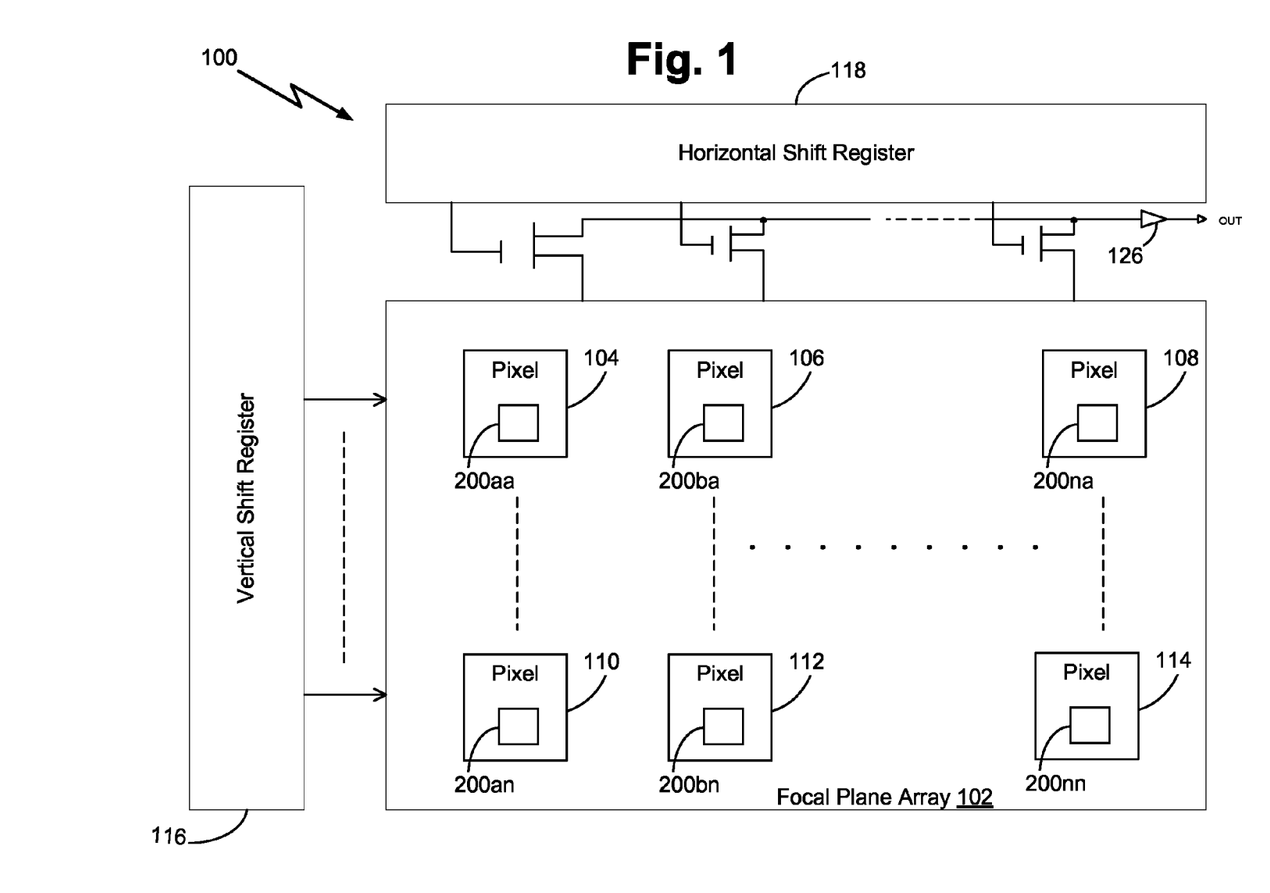
FIG. 1 is a block diagram of an exemplary infrared image sensor having a plurality of pixels, each pixel having a respective bolometer consistent with the present invention.

FIG. 1 is a block diagram of an exemplary infrared imaging system 100 having a focal plane array 102. The focal plane array includes a plurality of pixels 104, 106, 108, 110, 112 and 114 each of which includes a tunable infrared detector 200*aa*-200*nn* consistent with the present invention. In the implementation shown in FIG. 1, the infrared imaging system 100 also includes a vertical shift register 116 operatively configured to select a row of pixels (e.g., pixels 104, 106, and 108) and a horizontal shift register 118 operatively configured to shift the selected row of pixels to an amplifier 126 for output to an image processor (not shown in figures).

Figure 2:
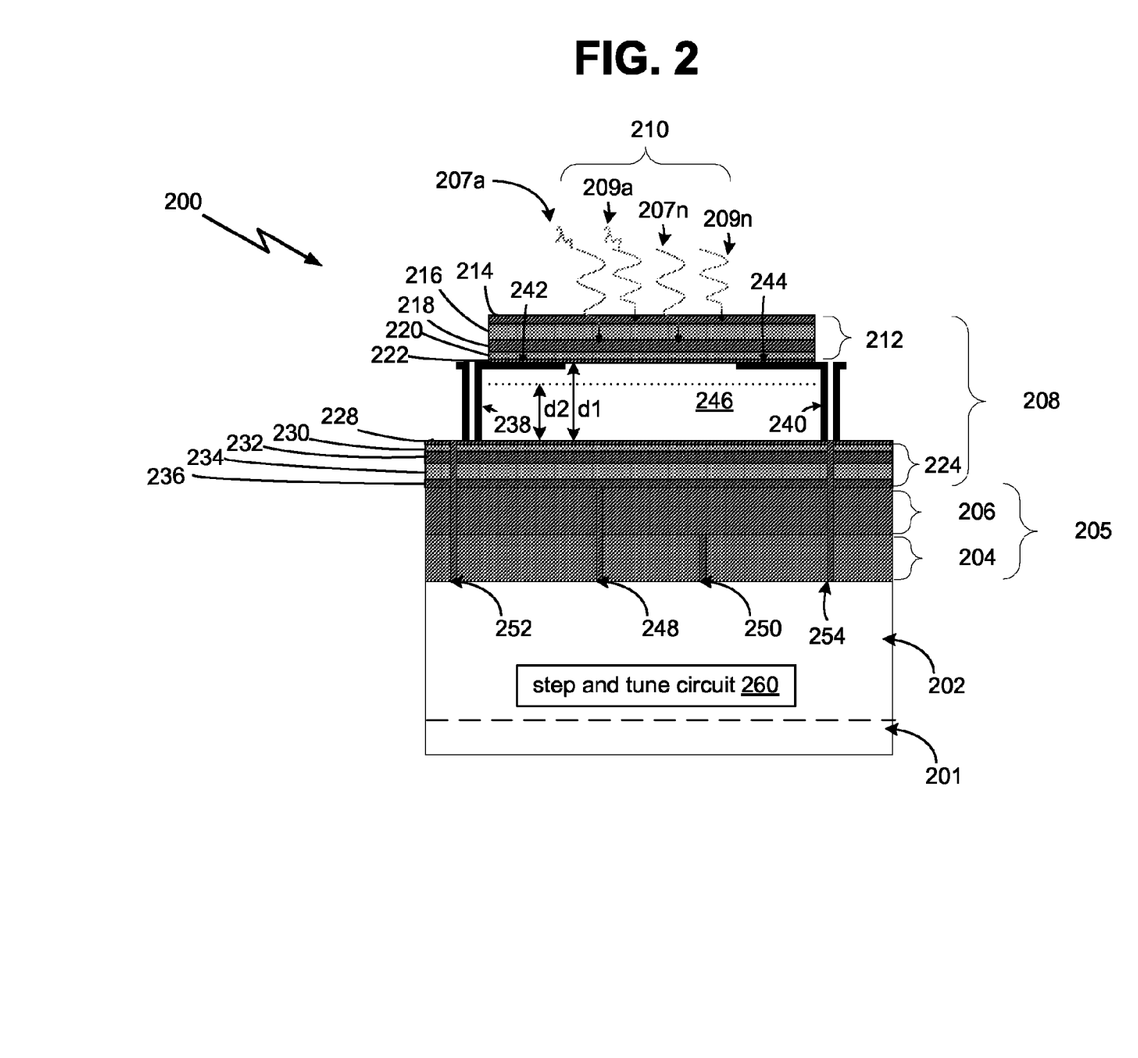
FIG. 2 is a front cross sectional view of an exemplary structure for each tunable infrared detector in FIG. 1.

FIG. 2 is a front cross sectional view of an exemplary structure for each tunable infrared detector 200aa-200nn. Each tunable infrared detector 200aa-200nn includes a readout circuit 202 formed in and/or on a substrate 201, a bottom wavelength detector 204 formed over the readout circuit 202, a top wavelength detector 206 formed over the bottom wavelength detector 204, and an interferometer filter 208 formed over the top wavelength detector 204 and the bottom wavelength detector 206. The bottom wavelength detector 204 and the top wavelength detector 206 collectively define a dual-band detector 205 of the respective tunable infrared detector 200. In the implementation shown in FIG. 2, the interferometer filter 208 is a Fabry Perot filter. However, the interferometer filter 208 may be any type of optical or semiconductor filter operatively configured to pass to the top wavelength detector 206 a first wavelength associated with a first portion (e.g., 1-1.4 μm) of a predetermined band of wavelengths (for example, wavelengths within a selected 100 nm section of the SWIR band) and a second wavelength associated with a second portion (e.g., 1.5-2.3 μm) of the predetermined band where the first and second wavelengths are selected by tuning the interferometer filter 208 as described in further detail below.

The bottom wavelength detector 204 and the top wavelength detector 206 may each be a photoconductor or photodiode comprising an infrared sensitive material, such as mercury cadmium telluride (HgCdTe), indium gallium arsenide (InGaAs), including platinum silicide (PtSi), or indium antimonide (InSb). The top wavelength detector 206 is operatively configured to detect a first wavelength 207a (or each wavelength 207a-207n) associated with the first portion of the predetermined band and to transmit the second wavelength 209a (or each wavelength 209a-209n) associated with the second portion of the predetermined band to the bottom wavelength detector 204. The bottom wavelength detector 204 is operatively configured to detect the second wavelength 209a (or each wavelength 209a-209n) transmitted through the top wavelength detector 206. Each of the detectors 204 and 206 is operatively connected to output on a respective via structure 248 or 250 to the readout circuit 202 a respective radiation signal corresponding to a radiation level of the respective detected wavelength 207a or 209a.

In one implementation, the top wavelength detector 206 is operatively configured to have a first cutoff wavelength (e.g., 1.4 μm) corresponding to the first portion or order of the SWIR band, allowing wavelengths equal to or greater the first cutoff wavelength (e.g., greater than 1.4 μm) to be transmitted through the top wavelength detector 206. In this implementation, the bottom wavelength detector 204 is operatively configured to have a second cutoff wavelength (e.g., 2.3 μm) corresponding to the second portion or order of the SWIR band so that wavelengths between the first and second cutoff wavelengths may be detected by the bottom wavelength detector 206. In one implementation, the cutoff wavelength of each detector layer is controlled by choosing the appropriate alloy composition of the infrared sensitive material (e.g., $Hg_{1-x}Cd_xTe$ material) used to form the detectors 204 and 206.

Each of the detectors 204 and 206 may be fabricated in a high density vertically integrated photodiode (HDVIP) format in which each of the two layers are passivated on both sides and then mounted sequentially on the readout circuit 202 with epoxy. The interferometer filter 208 is fabricated, using a known MEMS fabrication technique, such that the interferometer filter 208 extends over both the top wavelength detector 206 and the bottom wavelength detector 204. In the implementation shown in FIG. 2, the top wavelength detector 206 is fabricated to be stacked on top of the bottom wavelength detector 204. However, where space on the substrate 201 is not a concern, the two detectors 204 and 206 may be fabricated such that a portion of the top wavelength detector 206 overlaps a portion of the bottom wavelength detector 204 and an active area 210 of the interferometer filter 208 is formed to extend over the overlapping portions of the two detectors 204 and 206.

In the implementation shown in FIG. 2, the interferometer filter 208 includes a first mirror 212 having a first plurality of dielectric layers 214, 216, 218, 220 and 222, a second mirror 224 having a second plurality of dielectric layers 228, 230, 232, 234 and 236, and a pair of flexible supports 238 and 240 disposed between the first mirror 212 and the second mirror 224 such that the first mirror 212 is substantially parallel with and disposed a first predetermined distance (d1) over the second mirror 224. To enable the interferometer filter 208 to be tuned in accordance with the present invention, the flexible supports 216 and 218 are operatively configured to move the first mirror 212 from the first predetermined distance (d1) to a second predetermined distance (d2) over the second mirror 224 in response to an electrical or mechanical input from the readout circuit 202 on a corresponding wire via 252 or 254 through the detectors 204 and 206. Accordingly, the first and second mirrors 212 and 224 define a optically resonant cavity 246 that may be selectively adjusted between the first and second predetermined distances (d1) and (d2) as shown in FIG. 2. In one implementation, the readout circuit 202 has a step and tune circuit 260 to operatively control the spacing of the cavity 246 (between the first and second predetermined distances (d1) and (d2) by providing the respective electrical or mechanical input on the wire vias 252 and 224. In this implementation, each flexible support 216 and 218 includes a respective membrane member 242 or 244 upon which the first mirror 212 is disposed or formed. Each membrane member 242 and 244 is adapted to be biased away from the first mirror 212 based on the electrical or mechanical input from the step and tune circuit 260 so that the first mirror 212 moves from the first predetermined distance (d1) to the second predetermined distance (d2) over the second mirror 224.

At the first predetermined distance (d1), the first and second mirrors 212 and 224 collectively enable the first wavelength 207a in the first portion or order (e.g., 1-1.4 μm) of the predetermined band and the second wavelength 209a in the second portion or order (e.g., 1.5-2.5 μm) of the predetermined band (e.g., the SWIR band) to pass through the interferometer filter 208 to the top wavelength detector 206. When the top wavelength detector 206 has a first cut-off wavelength corresponding to the first portion or order of the predetermined band, the top wavelength detector 206 absorbs the radiation of the wavelength 207a in the first portion of the predetermined band and allows the wavelength 209a in the second portion of the predetermined band as received from the interferometer filter 208 to pass through to the bottom wavelength detector 204. At the second predetermined distance (d2), the first and second mirrors 212 and 224 collectively enable another or third wavelength 207n in the first portion or order (e.g., 1-1.4 μm) of the predetermined band and another or fourth wavelength 209n in the second portion or order (e.g., 1.5-2.5 μm) of the predetermined band (e.g., the SWIR band) to pass through the interferometer filter 208 to the top wavelength detector 206 for detection by the respective detectors 206 and 204. Thus, in accordance with the present invention, the interferometer filter 208 may be tuned by adjusting the spacing or distance between the mirrors 212 and 224 to enable two wavelengths within the predetermined band (e.g., SWIR band) to pass through to and be detected by the dual-band detector 205, where one of the two wavelengths is in the first portion (e.g., shorter wavelengths) of the predetermined band and another of the two wavelengths is in the second portion (e.g., longer wavelengths) of the predetermined band.

In one implementation, the first mirror 212 and the second mirror 224 are each a Bragg mirror. In this implementation, the dielectric layers 214, 216, 218, 220 and 222 of the first mirror 212 and the dielectric layers 228, 230, 232, 234 and 236 of the second mirror 224 each comprise an alternating sequence of layers of two different dielectric materials (or low loss material), in which the first of the two dielectric materials has a high refractive index and the second of the two dielectric materials has a low refractive index. For example, the high refractive index dielectric material may be germanium (Ge) and the low refractive index dielectric material may be some form of silicon oxide (SiOx).

In another implementation, the first mirror 212 and the second mirror 224 are each a chirped Bragg mirror. In this implementation, the dielectric layers 214, 216, 218, 220 and 222 of the first mirror 212 and the dielectric layers 228, 230, 232, 234 and 236 of the second mirror 224 each comprise an alternating sequence of layers of two different dielectric materials having a high refractive index and a low refractive index, respectively, as described above. However, in this implementation, each of the dielectric layers 214, 216, 218, 220 and 222 of the first mirror 212 has a respective thickness and the thickness of at least one of the dielectric layers of the first mirror 212 is different than the thickness of each of the first mirror's other layers. As shown in FIG. 2, each of the first mirror's 212 dielectric layers 214, 216, 218, 220 and 222 has a different thickness and are arranged such that the thickness of each layer 214, 216, 218, 220 and 222 varies relative to thickness of an adjacent layer 214, 216, 218, 220 and 222. The dielectric layers 228, 230, 232, 234 and 236 of the second mirror 224 correspond in reverse sequential order to the dielectric layers 214, 216, 218, 220 and 222 of the first mirror 212 such that the first layer 214 of the first mirror 212 corresponds (in thickness and dielectric material) to the last layer 236 of the second mirror 224.

One advantage of chirping (or varying the thickness of the respective dielectric layers) of each mirror 212 and 224 is to extend the range over which high reflectivity for the respective mirror 212 and 224 may be achieved for a given ratio of high to low refractive index dielectric layers of the respective mirrors 212 and 224. The width ($\Delta g$) of the high-reflectivity band in a standard quarter-wave Bragg mirror is related to $n_H$ and $n_L$ (the high and low values of refractive index of two adjacent layers (e.g., 214 and 216 in the mirror 212)) as shown in Equation (1).

$$\Delta g = \frac{2}{\pi} \sin^{-1}\left(\frac{n_H - n_L}{n_H + n_L}\right) \quad \text{Equation (1)}$$

where $$g = \frac{\lambda_0}{\lambda}$$

and $\lambda_0$ the center of wavelength of the high reflectivity band. The high reflectivity band, in wavelength numbers, extends from $(1-\Delta g)/\lambda_0$ to $(1+\Delta g)/\lambda_0$. In one implementation, to achieve a one octave high reflectance band between $\lambda=1000$ nm and $\lambda=2000$ nm in the mirror 212 or 224, $\Delta g \approx 0.33$, which translates to $n_H/n_L \approx 3$.

Another advantage of chirping (or varying the thickness of the respective dielectric layers) of each mirror 212 and 224 is to modify the phase response of each mirror 212 and 224 in the optically resonant cavity 246 in accordance with the present invention. Accordingly, the chirped Bragg mirrors 212 and 224 allows control over the position and number of resonant peaks for a selected separation of the mirrors 212 and 224 between the predetermined distances (d1) and (d2). In addition, because the chirped Bragg mirrors 212 and 224 may be selectively separated in accordance with the present invention to rapidly vary the collective phase response of the interferometer filter 208, the mirrors 212 and 224 enable narrower resonance peaks to be obtained for a given reflectivity than standard Bragg mirrors, resulting in the reflectivity of each mirror 212 and 224 being reduced for a given spectral linewidth. Accordingly, to tune over the predetermined band (e.g., the SWIR band of 1000 nm to 2500 nm), the mirrors 212 and 224 are structured such that there are only two, narrow, well spaced resonant peaks for each cavity 246 spacing (e.g., at the predetermined distances (d1) and (d2)).

Figure 3:
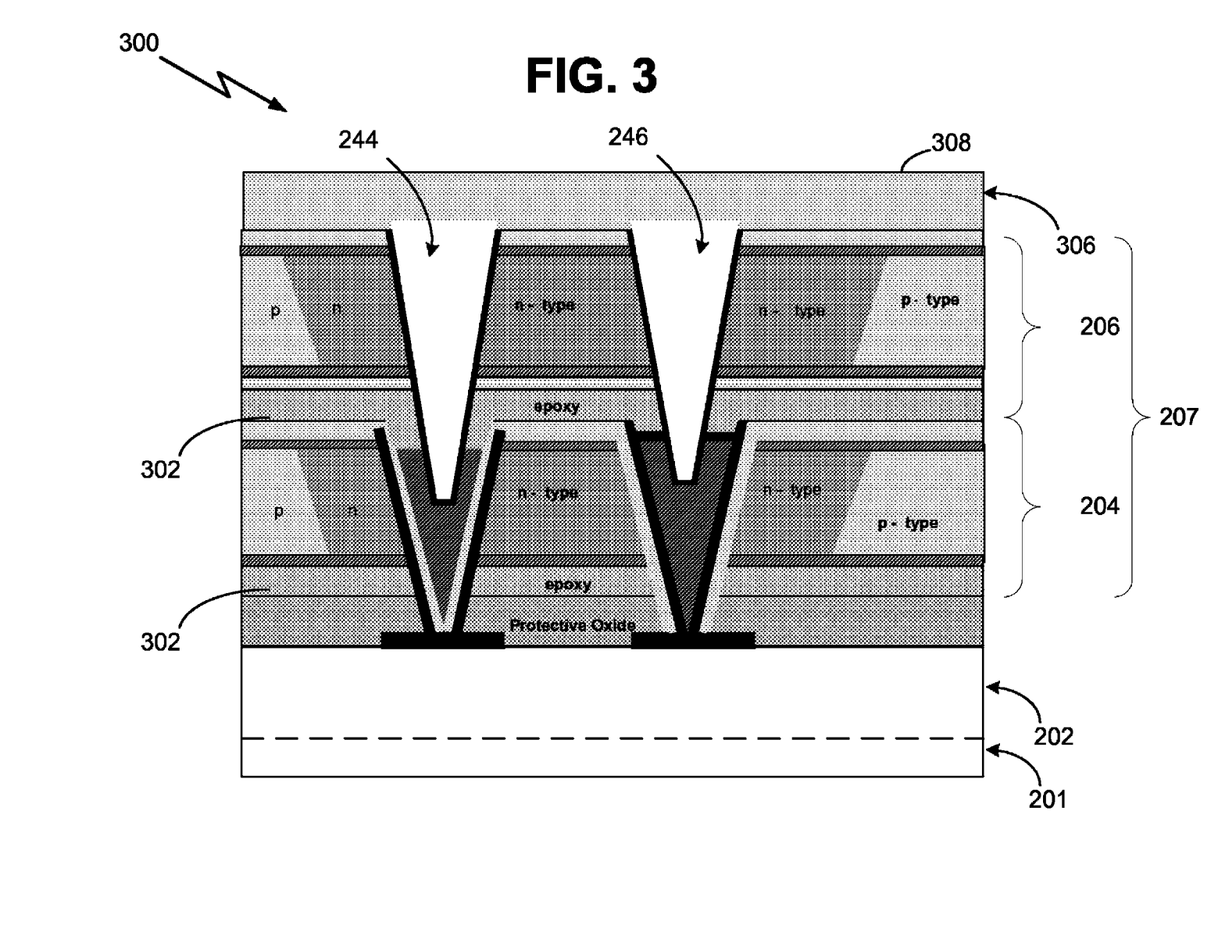
FIG. 3 is a front cross sectional view of two infrared detectors stacked in each tunable infrared detector in FIG. 1 in accordance with the present invention.

FIG. 3 is a front cross sectional view of the two wavelength detectors 204 and 206 upon which the interferometer filter 208 is formed in accordance with the present invention for each tunable infrared detector 200. As shown in FIG. 3, the two detectors 204 and 206 may be fabricated in a standard high density vertically integrated photodiode (HDVIP) format in which each of the two layers 204 and 206 are passivated on both sides and then mounted sequentially on the readout circuit 202 with an epoxy 302. In one implementation, a protective oxide layer 302 is formed over the readout circuit 202 before the two detectors 204 and 206 are each mounted on the protective oxide layer 302 and electrically connected to the readout circuit 202 vis-à-vis the respective via structure 248 or 250. In one implementation, a planarization layer 306 is formed over the top wavelength detector 206 using an epoxy cured with UV light. The planarization layer 306 has a planar surface 308 upon which the interferometer filter 208 may be fabricated in accordance with the present invention. The planarization of the detector 206 vis-à-vis the planarization layer 306 functions to minimize the spectral bandwidth of the interferometer filter 208.

In the implementation shown in FIG. 3, each detector 204 and 206 comprises a photodiode that is electrically connected to a respective one of the via structures 248 or 250 for reading out to the readout circuit 202 the radiation level of a corresponding wavelength 207a or 209a detected by the respective detector 204 and 206 in accordance with the present invention. The via structures 244 and 246 are formed by dry etching techniques such as by electron cyclotron resonance (ECR) or inductively coupled plasma (ICP) processes. Via 204 is not essential for the functioning of the device, but is included to show that in both bands detection can be designed to be spatially co-located.

Figure 4:
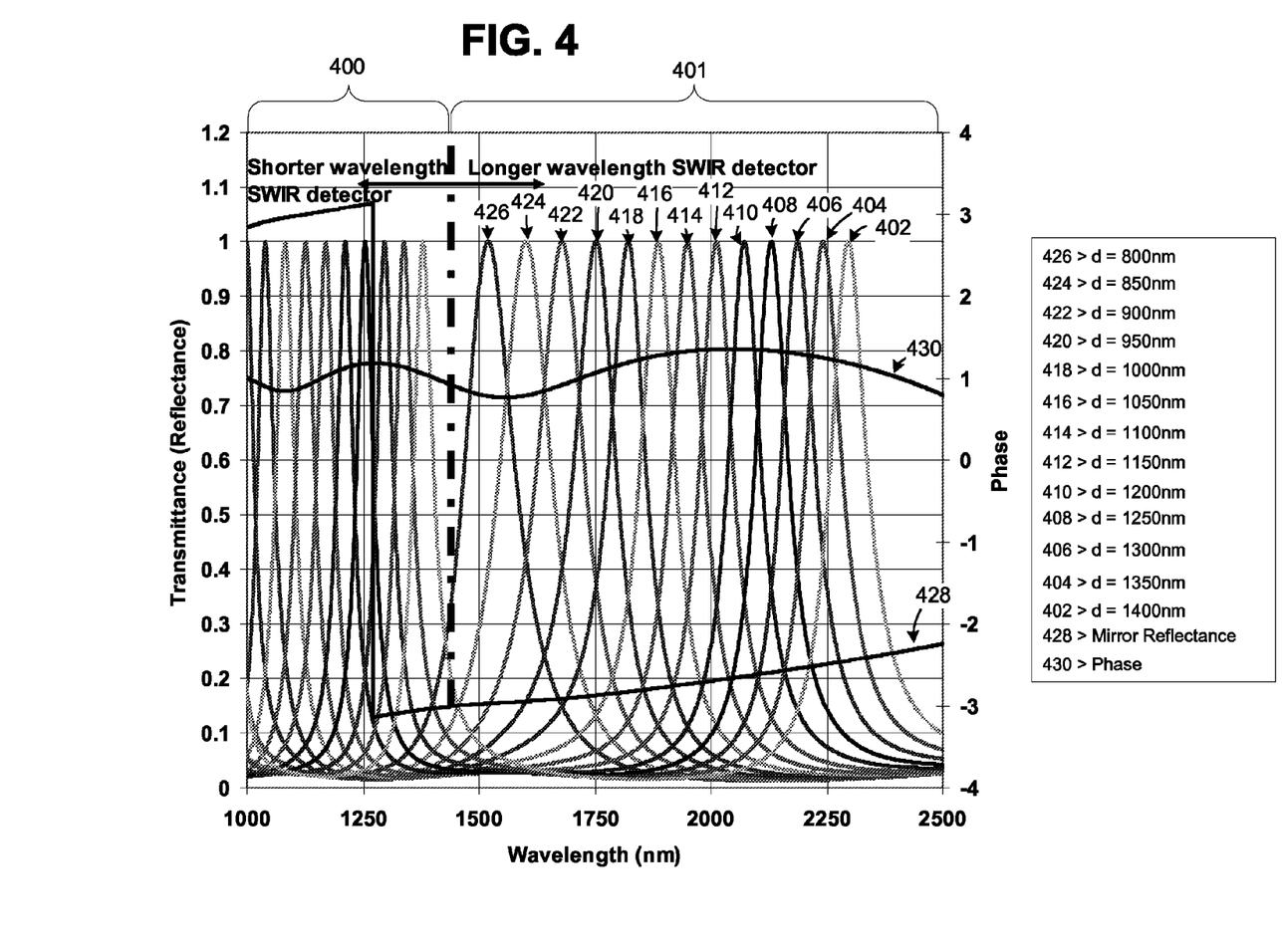
FIG. 4 is a graph depicting a first and a second order wavelength response of a modeled interferometer filter of a tunable infrared detector implemented in accordance with the present invention.

FIG. 4 is a graph depicting modeled first order 400 and second order 401 wavelength responses of the interferometer filter 208 of a tunable infrared detector 200 implemented as shown in FIGS. 2 and 3 in accordance with the present invention. In this implementation, the modeled interferometer filter 208 includes two chirped Bragg mirrors 212 and 224. The second or lower mirror 224 has five dielectric layers 228, 230, 232, 234, and 236 formed, in sequential order, of the following dielectric materials: amphorous Si (a-Si), $SiO_2$, a-Si, $SiO_2$, and a-Si and with the following respective thickness 110 nm, 265 nm, 212 nm, 147 nm, and 15 nm. In this implementation, each dielectric layer 228, 232, and 236 of a-Si is a high refractive index layer and each dielectric layer 230 and 234 of $SiO_2$ is a low refractive index layer. The first or top mirror 212 also has five dielectric layers 214, 216, 218, 220 and 222 which correspond in reverse sequential order to the five dielectric layers 228, 230, 232, 234, and 236 of the second or lower mirror 224 such that the first layer 214 of the first mirror 212 corresponds (in thickness and dielectric material) to the last layer 236 of the second mirror 224.

In this implementation, the spacing between the two mirrors 212 and 224 was varied from the first predetermined distance (d1) of 1.4 μm to the second predetermined distance (d2) of 0.8 μm. As shown in FIG. 3, narrow band filter first order response is obtained in the 1-1.4 μm band with corresponding second order response in the 1.5-2.3 μm band. In this implementation, the maximum transmission of the interferometer filter 208 varies in the range of 70-80% over the entire 1-2.5 μm band.

In accordance with the present invention, the interferometer filter 208 is fabricated on the dual-band detector 205, the top wavelength detector 206 of the dual-band detector 205 has a cutoff wavelength of 1.4 μm, and the bottom wavelength detector 204 of the dual-band detector 205 has a cutoff wavelength of 2.3 μm. In this implementation, the top detector 206 responds to or is operatively configured to detect the first order transmission or response 400 of the interferometer filter 208, absorbing all radiation of wavelengths less than 1.4 μm and transmitting to the bottom detector 204 radiation of wavelengths equal to or greater than 1.4 μm. The bottom detector 204 responds to or is operatively configured to detect the second order transmission or response 401 of the interferometer filter 208. Thus, in accordance with the present invention, the interferometer filter 208 having the two chirped Bragg mirrors 212 and 224 formed or mounted over the dual-band detector 307 enables the respective infrared detector 200 to be operatively configured for hyperspectral detection in the 1-2.3 μm spectral range, well beyond the maximum of one octave spectral response possible with a conventional single band detector.

In accordance with the present invention, the readout circuit 202 is operatively configured to electronically step or tune the interferometer filter 208 across the wavelength band by adjusting the spacing or cavity 246 between the mirrors 212 and 224. To adjust the spacing or cavity 246 to tune the filter 208, the readout circuit 202 provides to the mirror support members 216 and 218 an electrical or mechanical input corresponding to the respective wavelength to be detected by the top detector 206 and the bottom detector 204. In one implementation, the step and tune circuit 260 of the readout circuit 202 operates in a voltage control mode or in a charge control mode. Both modes incorporate a feedback-loop control circuit (not shown in the figures) to dampen and stabilize any vibrational effects on the mirrors 212 and 224 of the filter 208. For operation at a predetermined distance (d, where d1≧d≧d2) between the mirrors 212 and 224, the top detector 206 is operatively configured to detect narrowband radiation at a first order response 400 wavelength corresponding to the predetermined distance and the bottom detector 204 is operatively configured to detect wideband radiation at a second order response 401 wavelength corresponding to the same predetermined distance. In FIG. 4, the response curves 402, 404, 406, 408, 410, 412, 414, 416, 418, 420, 422, 424, and 426 each reflect the respective first order 400 wavelength within the first portion (e.g., 1.0-1.4 μm) of the predetermined SWIR band and the corresponding second order 401 wavelength within the second portion (e.g., 1.4-2.3 μm) of the predetermined SWIR band passed by the filter 208 when the predetermined distance (d) between the mirrors 212 and 224 is set to 1400 nm, 1350 nm, 1300 nm, 1250 nm, 1200 nm, 1150 nm, 1100 nm, 1050 nm, 1000 nm, 950 nm, 900 nm, 850 nm, and 800 nm, respectively. For example, in the implementation shown in FIGS. 2-4, when the step and tune circuit 260 of the readout circuit 202 sets the predetermine distance between the mirrors 212 and 224 to be 1250 nm, the first order response 400 wavelength of 1250 nm is transmitted through the filter 208 and detected by the top detector 206 while the second order response 401 wavelength of 2125 nm is transmitted through the filter 208 and the top detector 206 and detected by the bottom detector 204. As discussed herein, the readout circuit 202 is operatively configured to read and integrate the respective radiation wavelength signal detected by each detector 206 or 204.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. An infrared detector, comprising:
   a substrate;
   a bottom wavelength detector formed over the substrate, the bottom wavelength detector having a top side;
   a passivation layer formed on the top side of the bottom wavelength detector;
   a top wavelength detector mounted on the passivation layer so that the top wavelength detector is formed over the bottom wavelength detector layer; and
   an interferometer filter formed over the top wavelength detector layer and the bottom wavelength detector layer, said interferometer filter comprising:
      a first mirror having a first plurality of dielectric layers,
      a second mirror having a second plurality of dielectric layers, and
      at least two flexible supports disposed between the first mirror and the second mirror such that the first mirror is substantially parallel with and disposed a first predetermined distance over the second mirror;
   wherein
      the interferometer filter is configured to be tuned by said flexible supports moving the first mirror from the first predetermined distance to a second predetermined distance over the second mirror in response to at least one of an electrical and mechanical input to said supports;
      the interferometer filter simultaneously passes a first wavelength associated with a first portion of a predetermined band and a second wavelength associated with a second portion of the same predetermined band to the top wavelength detector,
      the top wavelength detector is operatively configured to detect each wavelength associated with the first portion of the predetermined band and to transmit each wavelength associated with the second portion of the predetermined band to the bottom wavelength detector, and
      the bottom wavelength detector is operatively configured to detect each wavelength associated with the second portion of the predetermined band, and
      the bottom wavelength detector detects the second wavelength in the second portion of the predetermined band approximately simultaneously with the top wavelength detector detecting the first wavelength in the first portion of the same predetermined band.

2. The infrared detector according to claim 1, wherein the interferometer filter is a Fabry Perot filter.

3. The infrared detector according to claim 1 further comprising a readout circuit operatively connected to each of the flexible supports and operatively configured to selectively provide the electrical or mechanical input to each of the flexible supports.

4. The infrared detector according to claim 3, wherein the readout circuit is operatively connected to the top wavelength detector and the bottom wavelength detector and operatively configured to simultaneously read from each detector a respective radiation signal corresponding to the respective wavelength detected by each detector.

5. The infrared detector according to claim 3, wherein the interferometer filter is operatively configured to pass a third wavelength associated with the first portion of the predetermined band and a fourth wavelength associated with the second portion of the predetermined band to the top wavelength detector when the first mirror is disposed at the second predetermined distance over the second mirror so that the bottom wavelength detector detects the fourth wavelength in the second portion of the predetermined band approximately simultaneously with the top wavelength detector detecting the third wavelength in the first portion of the same predetermined band.

6. The infrared detector according to claim 1, wherein the first predetermined distance is approximately 1.4 μm and the second predetermined distance is approximately 0.8 μm.

7. The infrared detector according to claim 1, wherein the predetermined band corresponds to the short wave infrared band.

8. The infrared detector according to claim 1, wherein the first portion of the predetermined band is in the range of 1 μm to 1.4 μm.

9. The infrared detector according to claim 1, wherein the second portion of the predetermined band is in the range of 1.5 μm to 2.3 μm.

10. The infrared detector according to claim 1, wherein the top wavelength detector has a first cut-off wavelength corresponding to the first portion of the predetermined band and the bottom wavelength detector has a second cut-off wavelength corresponding to the second portion of the predetermined band.

11. The infrared detector according to claim 1, each flexible support includes a respective membrane member upon which the first mirror is disposed, each membrane member is adapted to be biased away from the first mirror based on the electrical or mechanical input.

12. The infrared detector according to claim 1, wherein the first mirror and the second mirror are each a chirped Bragg mirror.

13. The infrared detector according to claim 12, wherein the dielectric layers of the first mirror and the dielectric layers of the second mirror each comprise an alternating sequence of layers of two different dielectric materials, in which the first of the two dielectric materials has a high refractive index and the second of the two dielectric materials has a low refractive index.

14. The infrared detector according to claim 13, wherein the first of the two dielectric materials having the high refractive index is one of germanium (Ge) or amorphous Si.

15. The infrared detector according to claim 13, wherein the second of the two dielectric materials having the low refractive index is SiOx.

16. The infrared detector according to claim 13, wherein each of the dielectric layers of the first mirror has a respective thickness and the thickness of at least one of the dielectric layers of the first mirror is different than the thickness of each of the other dielectric layers of the first mirror.

17. The infrared detector according to claim 13, wherein each of the dielectric layers of the first mirror has a different thickness and are arranged such that the thickness of each of the dielectric layers of the first mirror varies relative to thickness of an adjacent dielectric layer.

18. The infrared detector according to claim 17, wherein the dielectric layers of the second mirror correspond in reverse sequential order to the dielectric layers of the first mirror such that the first dielectric layer of the first mirror corresponds in thickness and dielectric material to the last layer of the second mirror.

19. An infrared imaging system, comprising:
one or more pixels, at least one of the pixels having a tunable infrared detector, the tunable infrared detector including:
a substrate;
a bottom wavelength detector formed over the substrate, the bottom wavelength detector having a top side;
a passivation layer formed on the top side of the bottom wavelength detector;
a top wavelength detector mounted on the passivation layer so that the top wavelength detector is formed over the bottom wavelength detector layer; and
an interferometer filter formed over the top wavelength detector layer and the bottom wavelength detector layer, said interferometer filter comprising:
a first mirror having a first plurality of dielectric layers,
a second mirror having a second plurality of dielectric layers, and
at least two flexible supports disposed between the first mirror and the second mirror such that the first mirror is substantially parallel with and disposed a first predetermined distance over the second mirror;
wherein
the interferometer filter is configured to be tuned by said flexible supports moving the first mirror from the first predetermined distance to a second predetermined distance over the second mirror in response to at least one of an electrical and mechanical input to said supports;
the interferometer filter simultaneously passes a first wavelength associated with a first portion of a predetermined band and a second wavelength associated with a second portion of the same predetermined band to the top wavelength detector, the top wavelength detector is operatively configured to detect each wavelength associated with the first portion of the predetermined band and to transmit each wavelength associated with the second portion of the predetermined band to the bottom wavelength detector, and the bottom wavelength detector is operatively configured to detect each wavelength associated with the second portion of the predetermined band, and
the bottom wavelength detector detects the second wavelength in the second portion of the predetermined band approximately simultaneously with the top wavelength detector detecting the first wavelength in the first portion of the same predetermined band, and
the tunable infrared detector further comprises a readout circuit that is operatively connected to the top wavelength detector and the bottom wavelength detector and operatively configured to read from each detector a respective radiation signal corresponding to the respective wavelength detected by each detector.

20. An infrared imaging system according to claim 19, wherein the readout circuit is operatively connected to each of the flexible supports and operatively configured to selectively provide the electrical or mechanical input to each of the flexible supports.

21. An infrared imaging system according to claim 19, wherein the interferometer filter is operatively configured to pass the first wavelength and the second wavelength when the first mirror is disposed at the first predetermined distance over the second mirror.

22. An infrared imaging system according to claim 19, wherein the interferometer filter is operatively configured to pass a third wavelength associated with the first portion of the predetermined band and a fourth wavelength associated with the second portion of the predetermined band to the top wavelength detector when the first mirror is disposed at the second predetermined distance over the second mirror so that the bottom wavelength detector detects the fourth wavelength in the second portion of the predetermined band approximately simultaneously with the top wavelength detector detecting the third wavelength in the first portion of the same predetermined band.

23. An infrared imaging system according to claim 19, wherein the top wavelength detector has a first cut-off wavelength corresponding to the first portion of the predetermined band and the bottom wavelength detector has a second cut-off wavelength corresponding to the second portion of the predetermined band.

24. An infrared imaging system according to claim 19, each flexible support includes a respective membrane member upon which the first mirror is disposed, each membrane member is adapted to be biased away from the first mirror based on the electrical or mechanical input.

25. An infrared imaging system according to claim 19, wherein the first mirror and the second mirror are each a chirped Bragg mirror.

26. An infrared imaging system according to claim 25, wherein the dielectric layers of the first mirror and the dielectric layers of the second mirror each comprise an alternating sequence of layers of two different dielectric materials, in which the first of the two dielectric materials has a high refractive index and the second of the two dielectric materials has a low refractive index.

27. An infrared imaging system according to claim 25, wherein each of the dielectric layers of the first mirror has a different thickness and are arranged such that the thickness of each of the dielectric layers of the first mirror varies relative to thickness of an adjacent dielectric layer.

28. An infrared imaging system according to claim 27, wherein the dielectric layers of the second mirror correspond in reverse sequential order to the dielectric layers of the first mirror such that the first dielectric layer of the first mirror corresponds in thickness and dielectric material to the last layer of the second mirror.

* * * * *